United States Patent [19]
Anderson

[11] Patent Number: 4,963,224
[45] Date of Patent: Oct. 16, 1990

[54] MOTORIZED CARPET AND TILE STRIPPING TOOL

[76] Inventor: Martin L. Anderson, Rte. 3, Box 60, Maple Lake, Minn. 55358

[21] Appl. No.: 457,193

[22] Filed: Dec. 26, 1989

[51] Int. Cl.[5] ........ B32B 31/18
[52] U.S. Cl. ........ 156/584; 30/170; 156/344; 299/37
[58] Field of Search ........ 30/169, 170; 156/344, 156/584; 299/36, 37

[56] References Cited

U.S. PATENT DOCUMENTS 2,874,946 2/1959 Singleterry et al. .
4,009,908 3/1977 Alinder et al. ........ 299/37
4,088,369 5/1978 Prater ........ 299/37
4,162,809 7/1979 Anderson et al. ........ 299/37

*Primary Examiner*—Robert A. Dawson
*Attorney, Agent, or Firm*—Haugen and Nikolai

[57] ABSTRACT

The carpet and stripping machine includes a frame supported by wheels, an elongated handle, an electric motor, blade and a driving connection between the blade and the motor. The improvement of the invention resides primarily in the drive connection which causes the blade to oscillate straight back and forth without any side to side component to its motion.

1 Claim, 1 Drawing Sheet

MOTORIZED CARPET AND TILE STRIPPING TOOL

BACKGROUND OF THE INVENTION

Field of the Invention

This invention relates to a carpet and tile stripping machine. More particularly, the invention relates to an improved machine of the type having a motorized blade which oscillates back and forth. Because of the improvements which make up the present invention, the blade moves straight back and forth with respect to the housing of the machine and the blade has no side to side component during operation.

While motorized machines have been used in the past to strip tile and carpet, such machines have been ineffective to positively clean the floor of material bonded thereto. For example, U.S. Patent No. 4,009,908 describes a device having a cutting blade driven through an oscillating member so that the blade pivots about a shaft in axial alignment with the travel of stripper. While this structure provides a relatively wide range of pivoting of the blade about a center point, the shear action is not uniform because of the lack of movement at the center of the blade. Similarly, U.S. Patent No. 2,874,946 describes a floor covering stripper utilizing a pure eccentric action to drive a cutting blade in an oscillating manner. However, the journalling of the oscillating cutting blade and the degree of eccentricity of the drive to create the oscillation creates certain disadvantages. If eccentricity is increased to increase the path of blade movement, the vibration is increased and a turning movement results due to the action of centrifugal force on the machine which results in difficulty in operating the machine and the possibility of damage to the machine. Further, if the oscillating part is not journalled, the machine is subject to extreme wear Still another carpet and tile stripper having an oscillating blade is disclosed in U.S. Patent 4,162,809 dated July 31, 1979 to Anderson, et al. This patent discloses mounting the stripping blade at an angle to the support frame opposite to the direction of rotation of the drive motor to offset the effect of centrifugal force on the frame and blade mounting assembly. This results in ease of operation of the machine and reduces vibration of the machine. The cutting or stripping blade is angled so as to bare against the floor with the blade traveling through an orbital path which is substantially a horizontal plane. While many users have found the tool disclosed in U.S. Patent 4,162,809 to be highly effective in removing carpet and tile, it does suffer from several disadvantages because the blade not only moves back and forth but also side to side as a result of the design of the eccentric mechanism used to orbital and oscillating movement.

SUMMARY OF THE INVENTION

The present invention constitutes an improvement over the prior art in that it contemplates a design in which the blade oscillates straight back and forth without any side to side component to its motion. Thus, the oval nature of the pattern imparted by prior art devices is changed to an extremely linear pattern. The design of the present invention is subject to less vibration than the designs contemplated by the prior art. Further, by eliminating the side to side component of the motion of the blade, the tendency of the machine to turn caused by the centrifugal force of the blade's drive mechanism is eliminated. Devices incorporating the present invention are easier to hold and operate during a stripping operation. This design also reduces wear of parts and maintenance costs associated with the machine.

DETAILED DESCRIPTION OF THE PREFERRED EMBODIMENT

Figure 1:
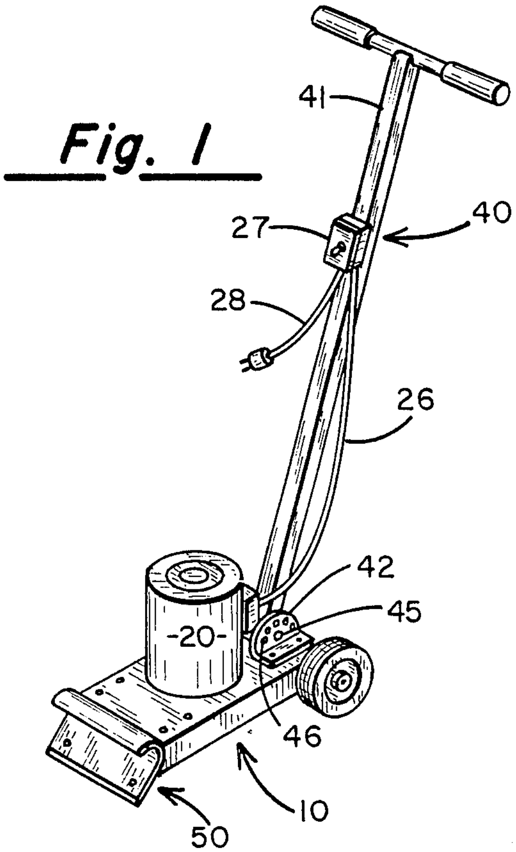
FIG. 1 is a perspective view of the carpet and tile stripping machine embodying the present invention.
Figure 2:
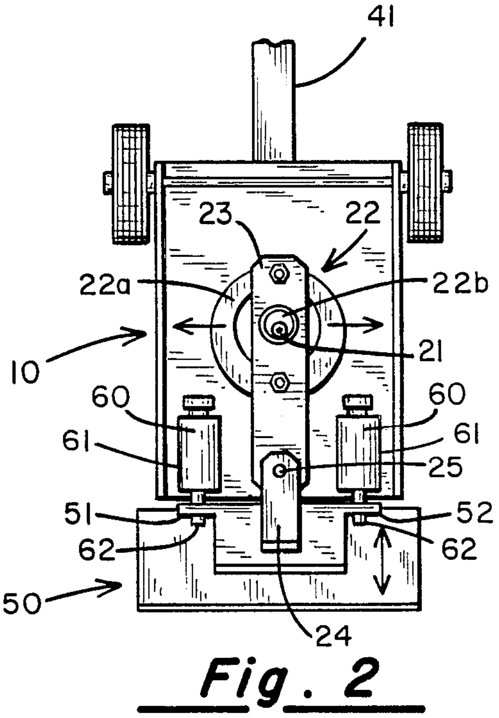
FIG. 2 is a bottom view showing the mechanism used to oscillate the blade straight back and forth without any side to side component.

A shown in FIG. 1, the present invention includes a frame 10, an electric motor 20 mounted to the top of the frame 10, wheels 30, and an elongated handle 40 pivotly mounted to the base frame 10, and a blade mounting assembly 50. The handle 40 includes an elongated shaft 41 which is pivotly mounted to the frame 10 by a pair of brackets 42. Each bracket 42 has a bore therethrough which is intended to line up with a bore (not shown) through elongated shaft 41 of handle 40. A pin 45 or a standard nut and bolt arrangement can then be inserted through the bores 43 in brackets 42 and through the bore of the handle of shaft 41 so that the pin 45 serves as an axle about which the elongated shaft 41 can rotate. The handle 40 can be locked in a particular orientation because it includes a pair of spring tabs (not shown), the ends of which are capable of penetrating through bores 46 in the brackets 42. When it is desirable to move the handle 40, the spring tabs can be depressed so they no longer mate with the bores 46.

The electric motor 20 is mounted on the top frame so that its shaft 21 projects downwardly through an opening 11 in the frame 10. The motor 20 is connected by a suitable electric cord 26 leading to a switch 27 with a cord 28 leading to a male plug of the type typically inserted into a normal wall outlet. The shaft 21 is suitably secured by a key (not shown) to cam 22.

Figure 3:
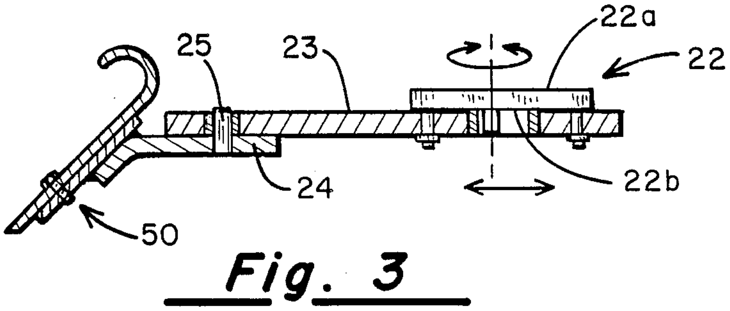
FIG. 3 is a side view of the mechanism used to drive the blade of the carpet and tile stripper of the present invention.

The elongated drive bar 23 projects toward the front of the frame 10 terminating just short of the front edge thereof. Pivotly secured to the front end of the drive bar 23 is a second elongated drive bar 24. The drive bar 24 is secured to the first drive bar 23 by a pin 25 so that the first and second drive bars freely pivot with respect to each other about pin 25. As best shown in FIG. 3, the second drive bar 24 has an angular orientation and terminates at the cutting blade mounting assembly 50.

Secured to the bottom of the frame 10 near its front on opposite sides of the location of the drive bars 23 and 24 are a pair of bearing members 60. Suitable bearing members are presently sold under the trademark OIL LITE. Bearing members 60 include a housing 61 and a pin 62 having one end slidably received with the housing and capable of moving longitudinally within said housing. These bearings also include a lubricant located within the housing 61 to ensure free movement of the pin 62 and seals to ensure that the lubricant does not escape from the housing. The opposite ends of pins 62 are fixed to the tabs 51 and 52 of the blade support member 50. Blade support member 50 also includes means for supporting a suitable blade.

Now that the structure of the present invention has been fully described, the operation of the device should be more easily understood. When the electric motor 20 is generized, it will cause the cam 22 to rotate in an orbital fashion because of the manner in which the eccentric member **22*b* is secured to the motor shaft. The first drive bar 23 which has been coupled to cam 22 will similarly move in an orbital fashion because it has been bolted to the base 22*a* of cam 22. The first drive bar 23 in combination with the second drive bar 24 would then normally cause the blade and blade mounting assembly to move in an orbital fashion. However the pivot pin 25 in combination with bearing members 60 restrict the motion of the blade mounting assembly so that it can only move reciprocalably back and forth with respect to the base frame. Any side to side component the motion which would otherwise be present is eliminated. Stated otherwise, because the first and second drive bars are pivotly connected to each other and the blade support member is coupled to a pair of bearings 60, any side to 10** side component of the motion of the blade and blade mounting assembly is eliminated.

It will be recognized that various modifications can be made to the apparatus. For example, the exact blade shape and supporting structure may be modified with different members so the connection of the drive bar and the eccentric may be varied as well as the arrangement and shape of the other parts. Therefore, in considering this invention, it should be remembered that the disclosure, while preferred at present is illustrative and the scope of the invention should be determined by the appended claims.

What is claimed is:

1. A carpet and tile stripping machine comprising:

a. a frame;

b. a pair of wheels rotatably mounted on the rear of the frame;

c. handle means projecting from the frame for guiding the stripping machine;

d. motor means mounted on said frame, said motor means including a drive shaft projecting generally vertically through said frame;

e. eccentric means coupled to said motor shaft for producing orbital motion in a substantially horizontal plane;

f. a cutting blade mounting assembly positioned in front of said frame, said mounting assembly including a blade mounting portion, a first elongated drive bar, and a pair of tabs located on opposite sides of said drive bar;

g. a cutting blade secured to said cutting blade mounting assembly;

h. a second elongated drive bar secured at one end to the eccentric means and pivotally connected at its other end to the first elongated drive bar;

i. a first bearing comprising a housing and a push rod, said housing secured to the frame on one side of said second elongated drive bar and said push rod having one end slidably received within said housing and its opposite end secured to one of the tabs on the cutting blade mounting assembly, and a second bearing comprising a housing and a push rod, said housing secured to the frame on the other side of said second elongated rive bar and said push rod having one end slidably received within said housing and its opposite end secured to the other of said tabs on the blade mounting assembly, said first and second bearings along with the pivotal connection between said first and second elongated rive bars serving to eliminate any lateral motion of the cutting blade mounting assembly so the cutting blade only moves back and forth in a straight line path of travel with respect to the frame in a selected horizontal plane.

* * * * *